(12) United States Patent
Sunayama et al.

(10) Patent No.: US 7,036,003 B1
(45) Date of Patent: Apr. 25, 2006

(54) INSTRUCTION PROCESSING DEVICE AND METHOD FOR CONTROLLING BRANCH INSTRUCTION ACCOMPANIED BY MODE CHANGE

(75) Inventors: Ryuichi Sunayama, Kanagawa (JP); Aiichiro Inoue, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/528,714

(22) Filed: Mar. 20, 2000

(30) Foreign Application Priority Data

Sep. 29, 1999 (JP) .................................. 11-276233

(51) Int. Cl.
G06F 9/00 (2006.01)
(52) U.S. Cl. ...................................... 712/233; 712/234
(58) Field of Classification Search .................. 712/43, 712/229, 233, 234, 224
See application file for complete search history.

(56) References Cited

U.S. PATENT DOCUMENTS

| | | | | |
|---|---|---|---|---|
| 4,881,170 A | * | 11/1989 | Morisada | 712/207 |
| 4,954,947 A | * | 9/1990 | Kuriyama et al. | 712/218 |
| 5,142,630 A | * | 8/1992 | Ishikawa | 712/234 |
| 5,420,992 A | * | 5/1995 | Killian et al. | 703/27 |
| 5,442,756 A | * | 8/1995 | Grochowski et al. | 712/238 |
| 5,752,259 A | * | 5/1998 | Tran | 711/125 |
| 5,754,811 A | * | 5/1998 | Putrino et al. | 712/214 |
| 5,961,637 A | * | 10/1999 | Sturges et al. | 712/235 |
| 5,963,721 A | * | 10/1999 | Shiell et al. | 710/305 |
| 6,427,204 B1 | * | 7/2002 | Arimilli et al. | 712/206 |

FOREIGN PATENT DOCUMENTS

| | | |
|---|---|---|
| JP | 61-278935 | 12/1986 |
| JP | 63-298633 | 12/1988 |
| JP | 4-245334 | 9/1992 |

OTHER PUBLICATIONS

InstantWeb. "Online Computing Dictionary". ©1995. Search term: addressing mode. http://www.instantweb.com/foldoc/foldoc.cgi?query=addressing+mode.*
Microsoft Press®. "Computer Dictionary: The Comprehensive Standard for Business, School, Library, and Home". Second Edition. Redmond, Washington: Microsoft Press®, 1994. p. 13.*
Rosenberg, Jerry M. "Dictionary of Computers, Information Processing, and Telecommunications". Second Edition. New York: John Wiley & Soncs, Inc. ©1987. p. 11.*
Notification of Reason(s) for Refusal in Japanese Patent Application No. 11-276233, mailed Jul. 27, 2004.

* cited by examiner

*Primary Examiner*—Eddie Chan
*Assistant Examiner*—Aimee Li
(74) *Attorney, Agent, or Firm*—Staas & Halsey LLP

(57) ABSTRACT

In the out-of-order process of an instruction, the address mode information of a fetched branch instruction is automatically transferred from an instruction fetch pipeline to an instruction execution pipeline. If the branch instruction is accompanied by an address mode change, the address mode after change designated by the branch instruction is adopted as the address mode of a branch destination. If the branch instruction is not accompanied by an address mode change, the transferred address mode information is adopted as the address mode of the branch destination.

15 Claims, 12 Drawing Sheets

Figure 2:
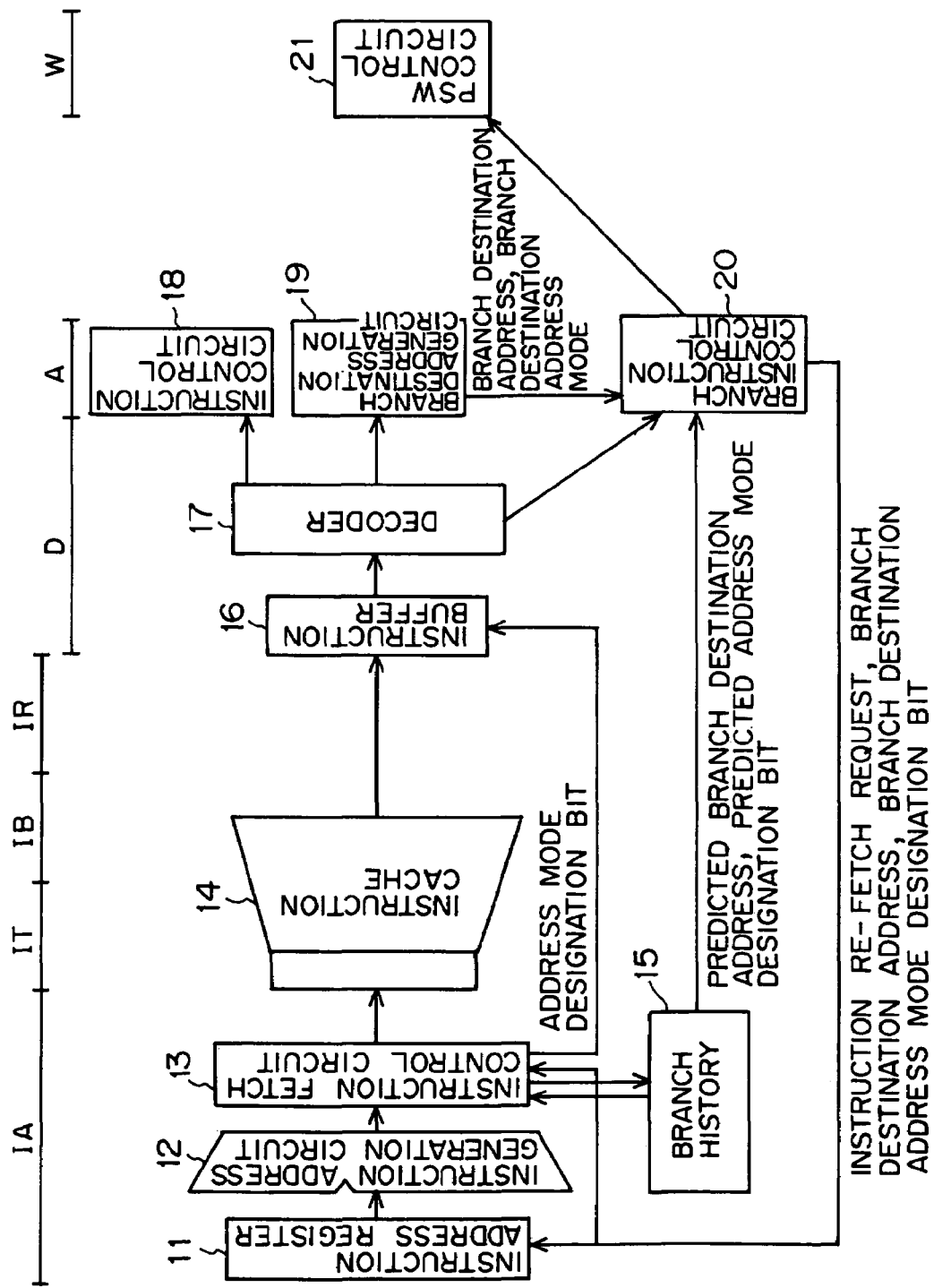

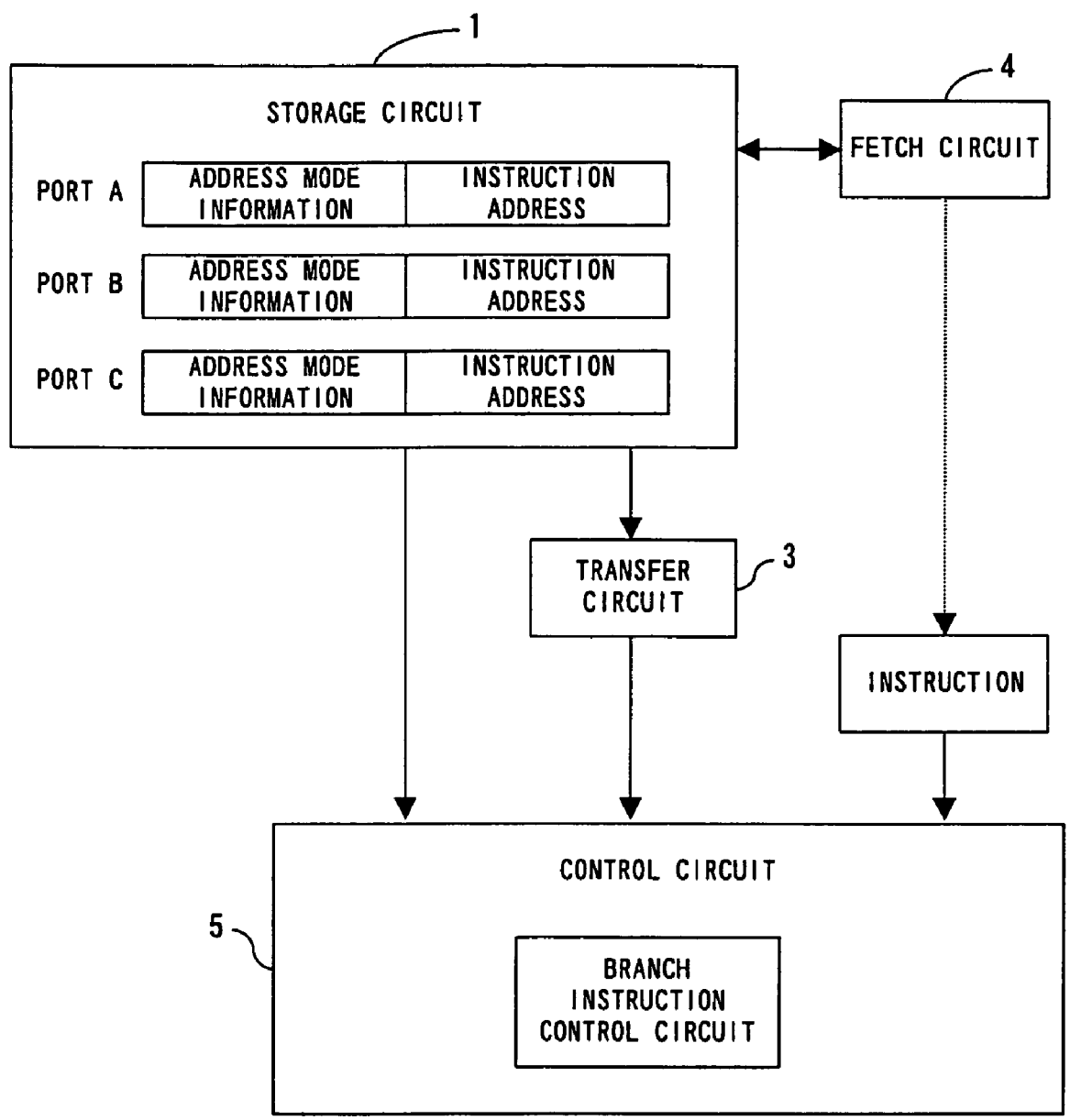
F I G. 1

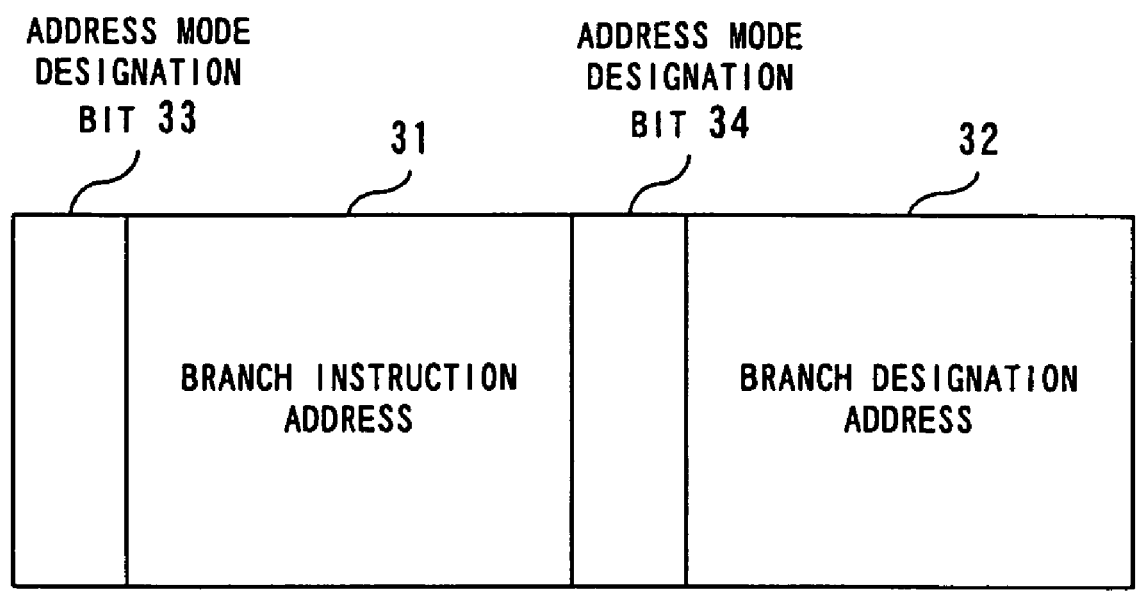
F I G. 4

INSTRUCTION PROCESSING DEVICE AND METHOD FOR CONTROLLING BRANCH INSTRUCTION ACCOMPANIED BY MODE CHANGE

BACKGROUND OF THE INVENTION

1. Field of the Invention

The present invention relates to an information processing apparatus adopting an out-of-order process system. In particular, the present invention relates to an instruction processing device for controlling a branch instruction accompanied by a mode change by way of hardware in an information processing apparatus with a plurality of ports for an instruction fetch, and a method thereof.

2. Description of the Related Art

In an information processing apparatus adopting an out-of-order processing system, subsequent instruction strings are sequentially inputted to a plurality of pipelines before one instruction execution is completed, and performance is improved by executing the instructions using those pipelines.

However, if the execution result of a present instruction affects the execution of a subsequent instruction, the subsequent instruction cannot be executed before the execution of the present instruction is completed. If an instruction process which affects the execution of a subsequent instruction is delayed, a subsequent instruction cannot be executed during the delay and continues to wait for the completion of the execution of the present instruction. Accordingly, disorder occurs in a pipeline and the performance of an instruction process is degraded.

A branch instruction is a typical example of such an instruction. In a branch instruction, since whether the branch occurs is unknown until the execution is completed and the target address of the branch destination is also unknown, a subsequent instruction is held and the pipeline is disturbed.

Under these circumstances, the high-speed execution of a branch instruction is promoted by using a branch history (branch prediction table). If a branch prediction using a branch history is made when a branch instruction is executed, a subsequent instruction and a branch destination instruction can be processed before it is determined whether the branch occurs.

According to this process system, if a branch instruction is executed, and as a result, it is found that the branch occurs, the instruction address of a branch destination and the instruction address of the branch instruction itself are paired and registered in a branch history in advance. When the instruction is extracted from a main storage device, the branch history is retrieved prior to the execution of the instruction.

In this way, pairs of the instruction address of a branch instruction that is previously branched and the instruction address of a branch destination are registered in a branch history. A branch instruction which is not registered in a branch history and has been branched must be newly registered in the branch history. If the target address of the branch destination of a branch instruction is changed for some reason, the target address of the branch destination obtained by retrieving it from the branch history becomes invalid.

Out of the entries of a branch history, entries corresponding to the following cases are considered to have a high possibility of failing in a branch prediction and are removed from the branch history:

(1) a prediction that a branch is taken fails twice in succession (2) a prediction that a branch is taken fails and the target address of a branch destination is also incorrect (3) an instruction is registered by mistake although the instruction is not actually a branch instruction If a prediction that a branch is taken fails or the target address of a branch destination is incorrect, such information must be stored for each target.

However, the conventional instruction process described above has the following problem.

According to the conventional instruction processing device, since an address mode indicating the bit size of an address space is determined by software, the address mode is sometimes changed while an instruction is executed. However, when the branch prediction of a branch instruction accompanied by an address mode change is made, only the instruction address of a branch destination can be predicted since a mechanism for predicting the address mode of a branch destination is not provided. Therefore, the pre-fetch of a branch destination instruction string cannot be performed based on the changed address mode, and thereby a correct instruction process cannot be executed.

When the instruction address of a branch destination is calculated and obtained using an address generator, the address mode of the branch destination can not also be obtained. When the pre-fetch of an instruction is performed at a specific port in an instruction process device provided with a plurality of instruction fetch ports and then the fetch is attempted to be restored to a sequential instruction fetch at another port, a correct instruction process cannot also be executed if the address modes of the respective ports are different.

In this way and according to the conventional instruction process device, if an address mode is changed, a correct instruction process is sometimes not executed. Accordingly, control using a micro-program becomes necessary and thereby the number of clocks needed for the control increases, which is a problem.

SUMMARY OF THE INVENTION

The object of the present invention is to provide an instruction processing device for performing a higher-speed instruction process in an information processing apparatus adopting an out-of-order process system, and a method thereof.

In the first aspect of the present invention, an instruction process device comprises a storage circuit, a branch instruction control circuit and a transfer circuit. The storage circuit stores the address mode information as well as the instruction address of a fetched instruction. If the fetched instruction is a branch instruction, the branch instruction control circuit controls the branch instruction using the address mode information. When the branch instruction is executed, the transfer circuit transfers the address mode information stored in the storage circuit to the branch instruction control circuit.

In the second aspect of the present invention, an instruction process device comprises a storage circuit, a fetch circuit and a control circuit. The fetch circuit fetches an instruction. The storage circuit stores the address mode information of each fetched instruction as a part of an instruction address. The control circuit controls the instruction process of each instruction based on the stored address mode information.

In the third aspect of the present invention, an instruction process device comprises a storage circuit, a fetch circuit and a plurality of instruction fetch ports, and performs an instruction fetch by way of an out-of-order system. The storage circuit stores the address mode information obtained when an instruction fetch request is issued, as well as an instruction address for each port. The fetch circuit performs an instruction fetch based on address mode information corresponding to a port to be used.

BRIEF DESCRIPTIONS OF THE DRAWINGS

Figure 3:
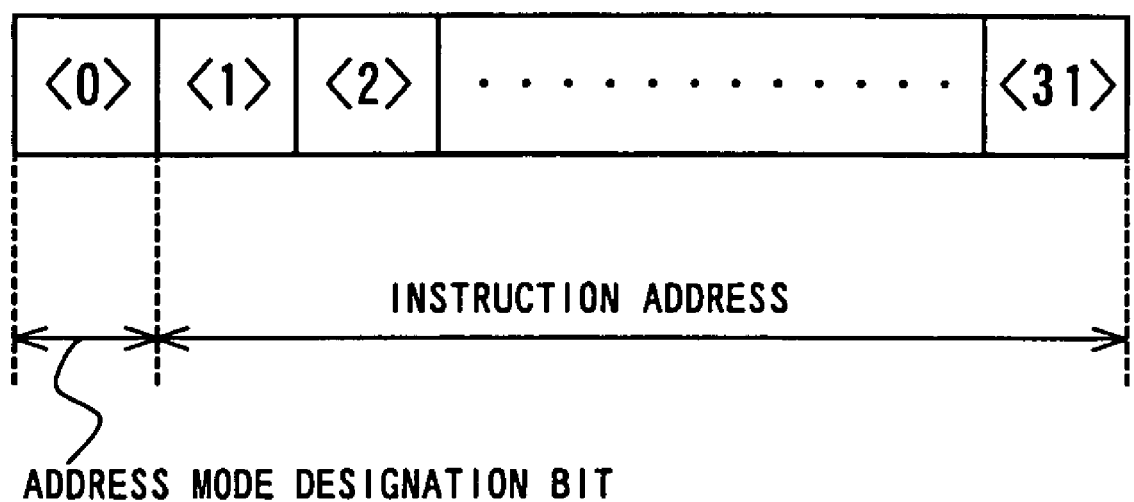
Figure 5:
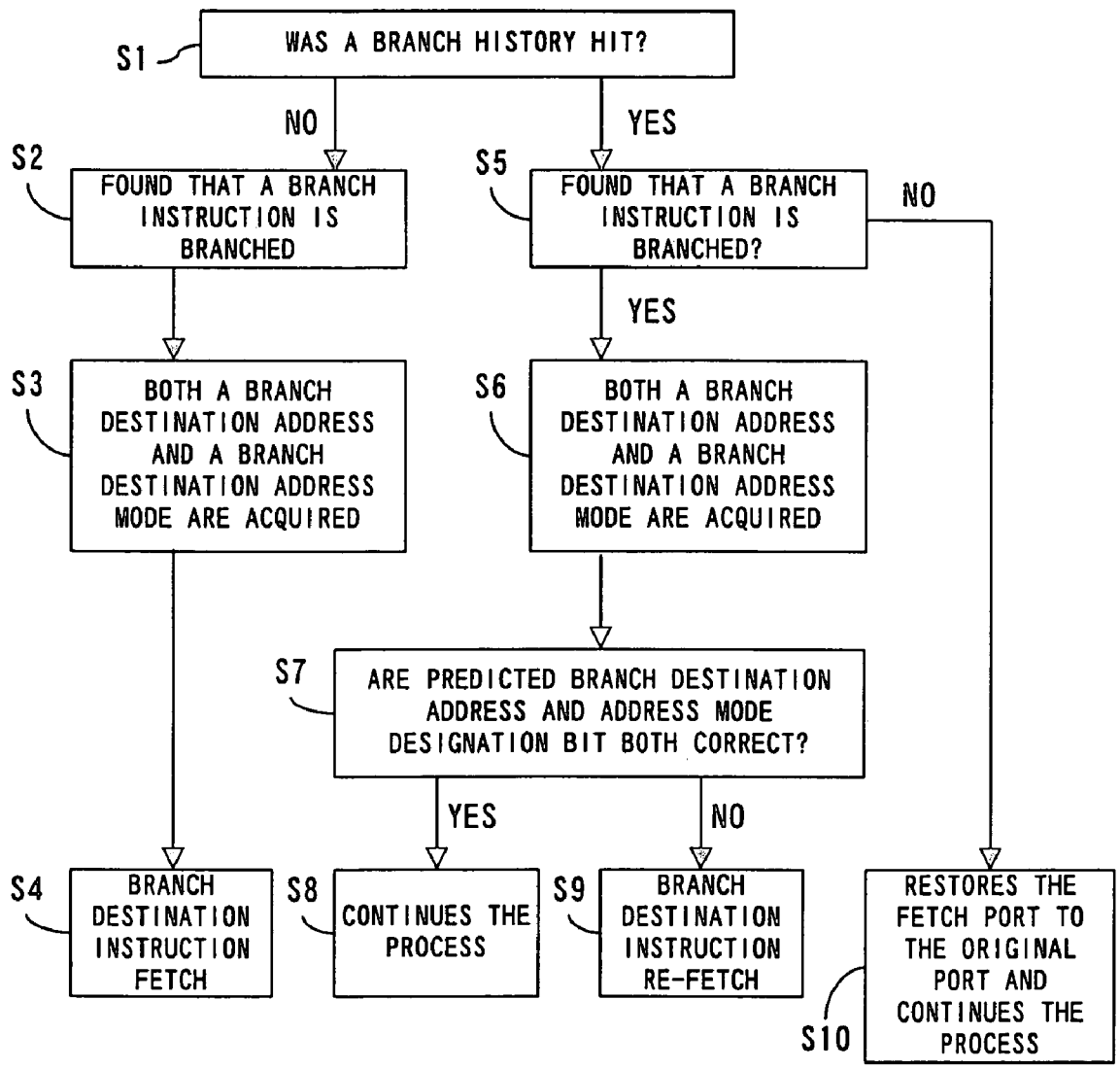
Figure 6:
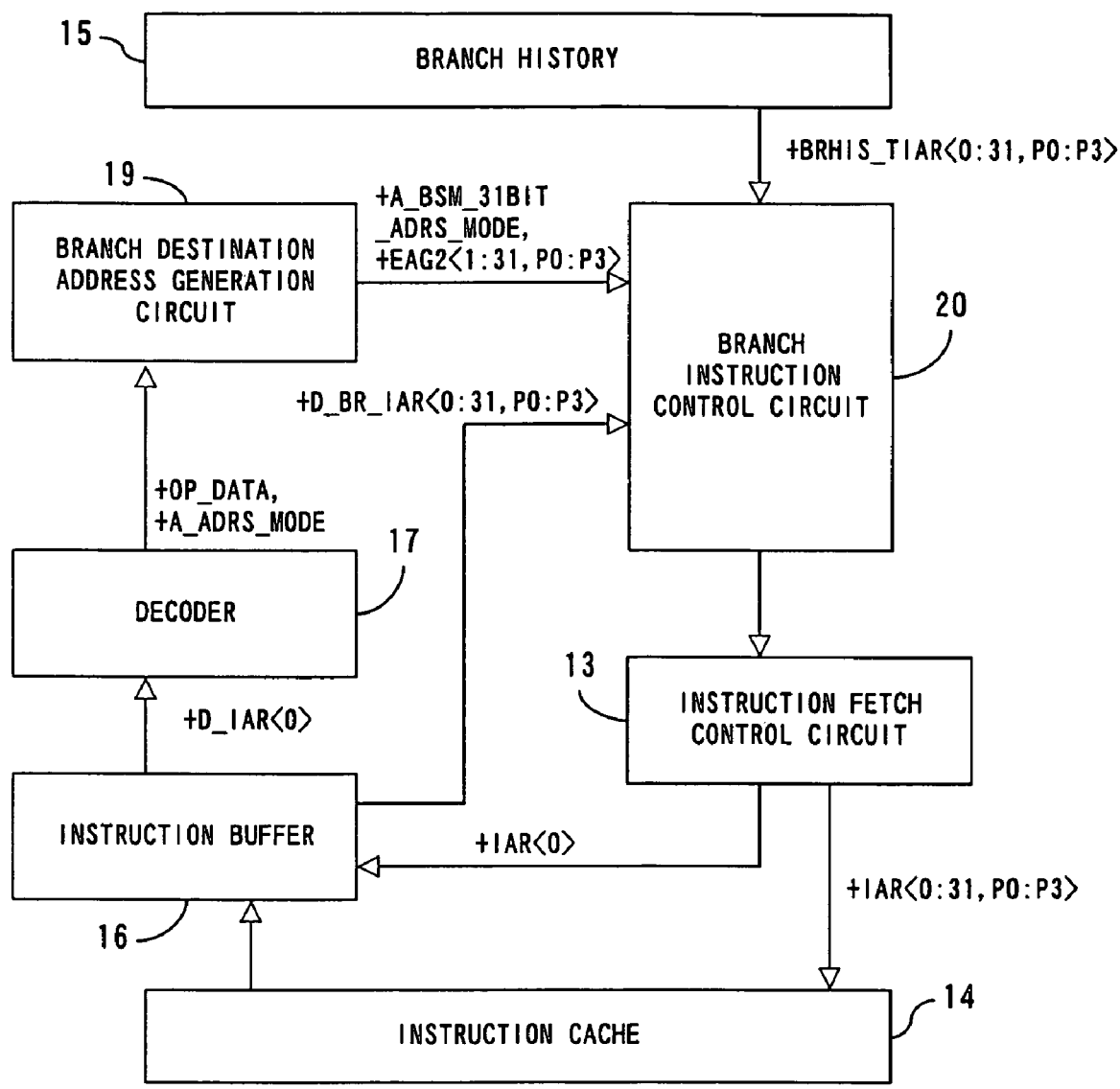
Figure 7:
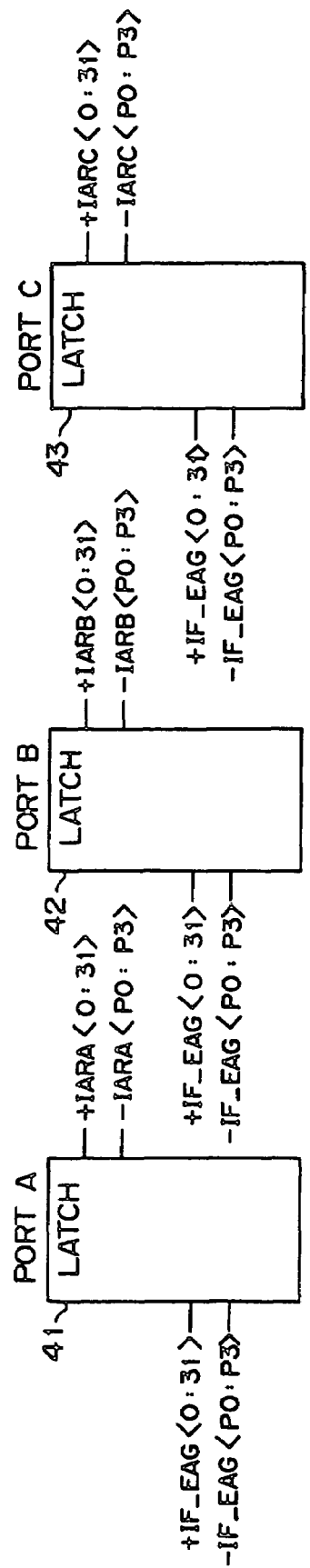
Figure 8:
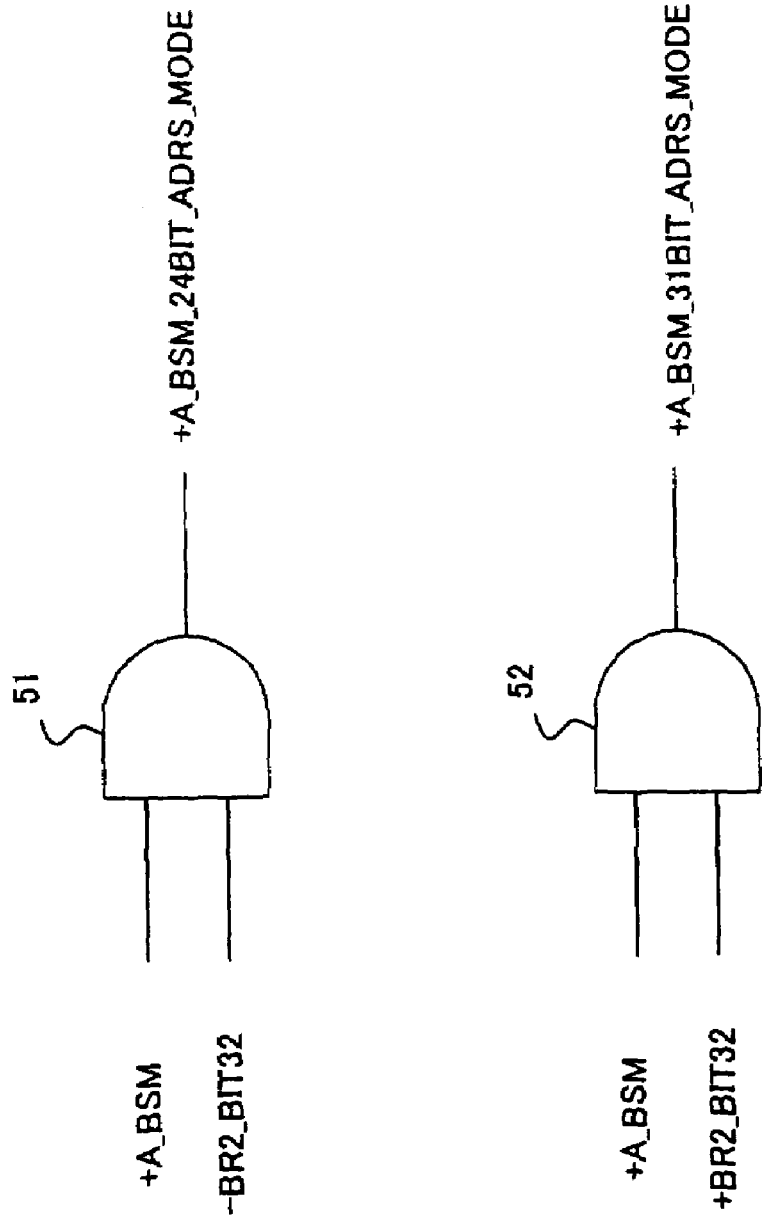
Figure 9:
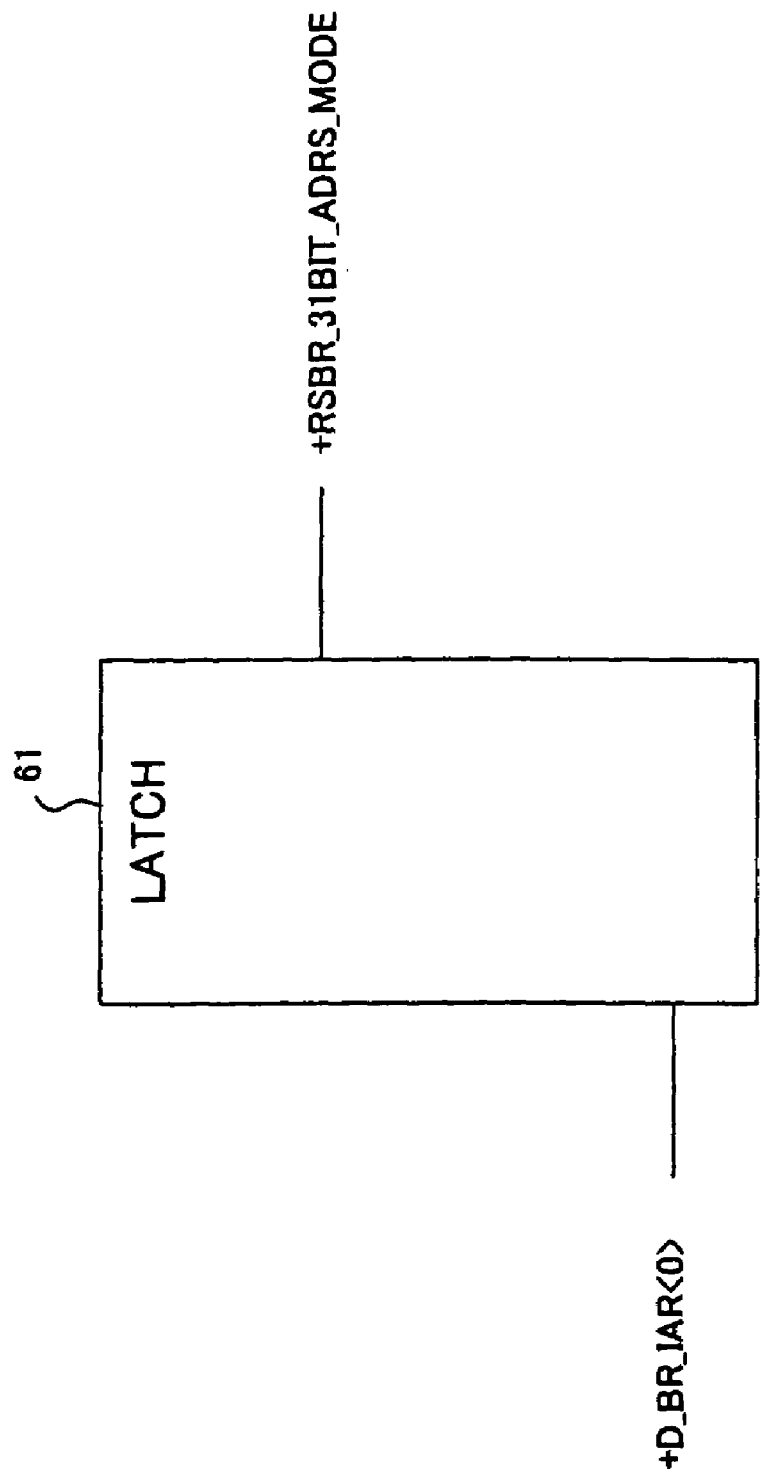
Figure 10:
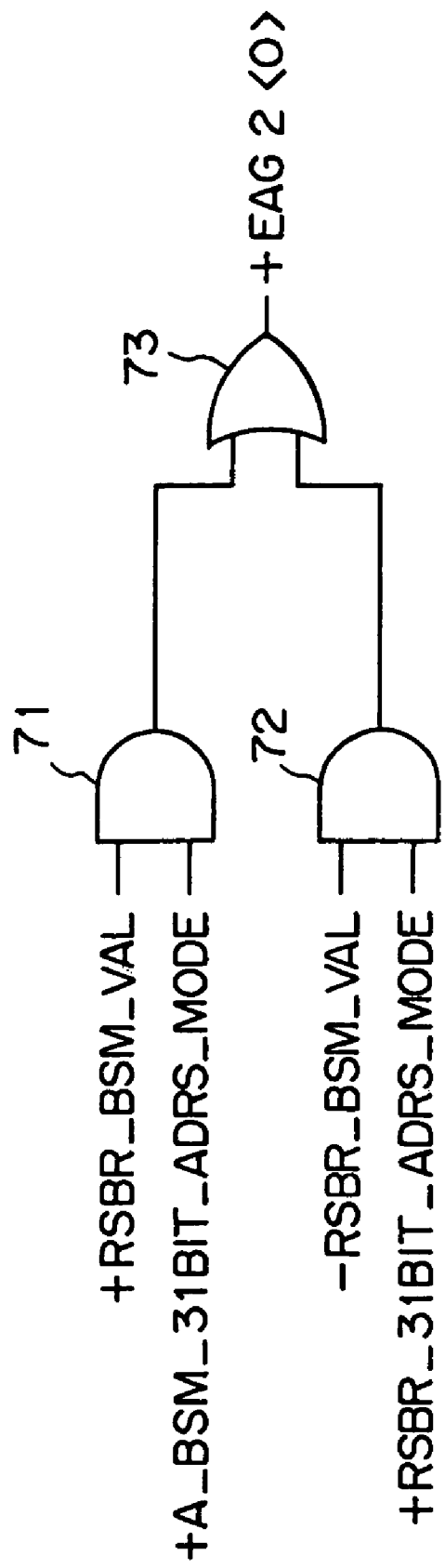
Figure 11:
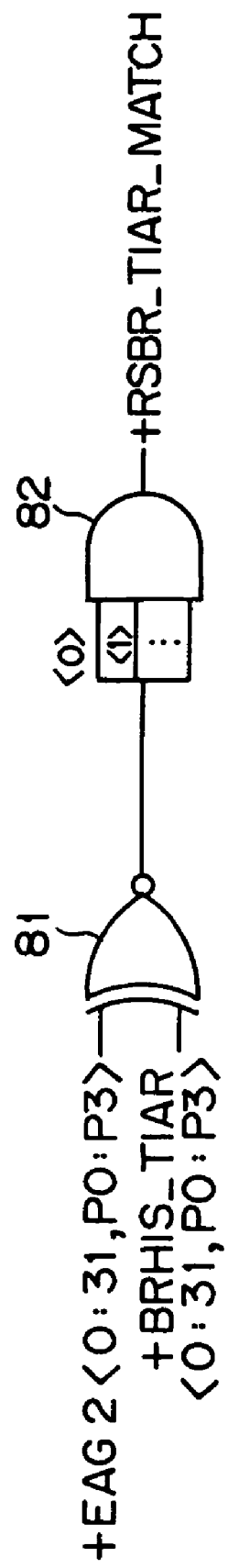
Figure 12:
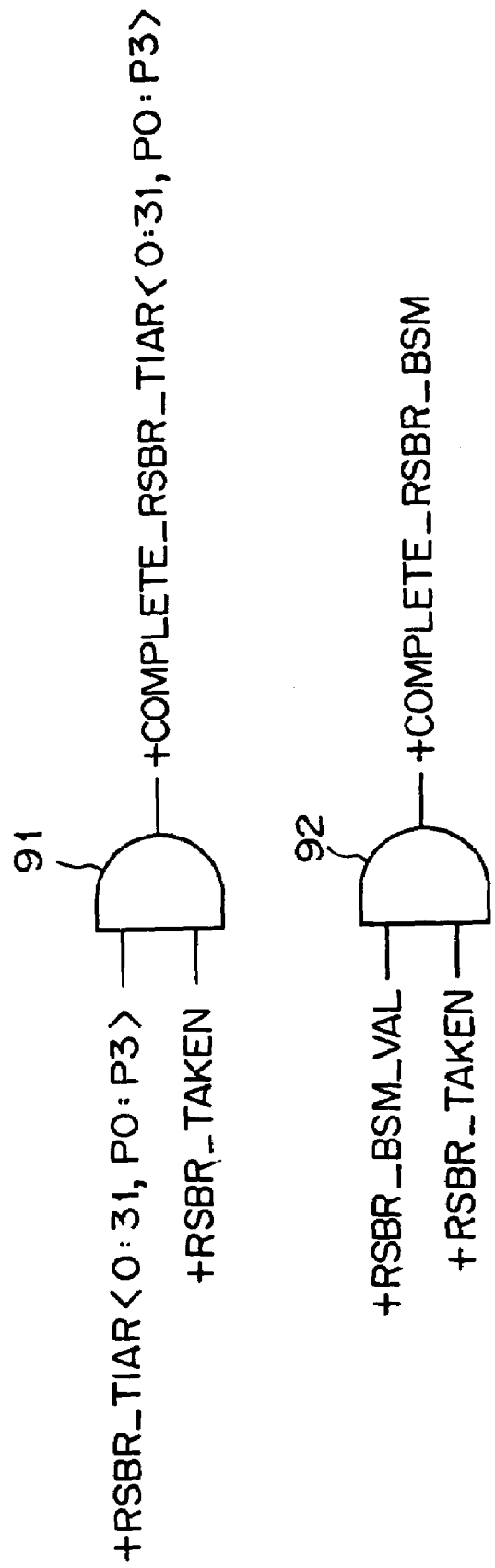

FIG. 1 shows the basic configuration of an instruction processing device of the present invention.
FIG. 2 shows the detailed configuration of an instruction processing device.
FIG. 3 shows an address mode designation bit.
FIG. 4 shows the format of the entry of a branch history.
FIG. 5 is a flowchart showing the operation of an instruction processing device.
FIG. 6 shows signals used for an instruction process.
FIG. 7 shows an address mode storage circuit.
FIG. 8 shows the first address mode generation circuit.
FIG. 9 shows the second address mode generation circuit.
FIG. 10 shows an address mode designation bit generation circuit.
FIG. 11 shows a judgment circuit.
FIG. 12 shows a control signal generation circuit.

DESCRIPTION OF THE PREFERRED EMBODIMENTS

The preferred embodiments of the present invention are described in detail with reference to the drawings.
FIG. 1 shows the basic configuration of an instruction processing device of the present invention.
In the first aspect of the present invention, an instruction processing device comprises a storage circuit 1, a branch instruction control circuit 2 and a transfer circuit 3. The storage circuit 1 stores the address mode information of a fetched instruction as well as the instruction address of the fetched instruction. If the fetched instruction is a branch instruction, the branch instruction control circuit 2 controls the branch instruction using the address mode information. When the branch instruction is executed, the transfer circuit 3 transfers the address mode information stored in the storage circuit 1 to the branch instruction control circuit 2.

The address mode information of the fetched instruction is stored with the instruction address in the storage circuit 1, and is transferred to the branch instruction control circuit 2 by the transfer circuit 3. The branch instruction control circuit 2 controls a branch instruction using the transferred address mode information.

According to such an instruction processing device, the address mode information of a fetched branch instruction is automatically transferred from an instruction fetch pipeline to an instruction execution pipeline. Then, if the branch instruction is accompanied by an address mode change, the branch instruction control circuit 2 can adopt the address mode after change, which is designated by the branch instruction, as the address mode of a branch destination. If the branch instruction is not accompanied by an address mode change, the branch instruction control circuit 2 can adopt the transferred address mode information as the address mode of a branch destination.

Therefore, a correct branch destination address mode is automatically determined. Accordingly, there is no need for control using a micro-program and thereby an instruction process speed can be improved.

In the second aspect of the present invention, an instruction processing device comprises a storage circuit 1, a fetch circuit 4 and a control circuit 5. The fetch circuit 4 fetches an instruction. The storage circuit 1 stores the address mode information of each fetched instruction as a part of an instruction address. The control circuit 5 controls the instruction process of each instruction based on the stored address mode information.

The address mode information of the instruction fetched by the fetch circuit 4 is stored in the storage circuit 1 as a part of the instruction address, and the control circuit 5 controls an instruction process using the stored address mode information.

According to such an instruction processing device, since the address mode information of each fetched instruction can be stored as a part of an instruction address, there is no need to provide a new register, etc., for exclusive use with address mode information. If the branch instruction is accompanied by an address mode change, the control circuit 5 can adopt the address mode after change, which is designated by the branch instruction, as the address mode of a branch destination. If the branch instruction is not accompanied by an address mode change, the control circuit 5 can adopt the stored address mode information as the address mode of a branch destination.

Therefore, a correct branch destination address mode is automatically determined. Accordingly, there is no need for control using a micro-program and thereby an instruction process speed can be improved.

In the third aspect of the present invention, an instruction processing device comprises a storage circuit 1, a fetch circuit 4 and a plurality of instruction fetch ports, and performs an instruction fetch by way of an out-of-order system. The storage circuit 1 stores the address mode information obtained when an instruction fetch request is issued, as well as an instruction address for each port. The fetch circuit 4 performs an instruction fetch based on address mode information corresponding to a port to be used.

When an instruction fetch request is issued in an instruction fetch pipeline, the address mode information and the instruction address of the instruction to be fetched are related to a port to be used and stored in the storage circuit 1. The fetch circuit 4 interprets the instruction address based on the address mode information corresponding to the port to be used, and fetches the instruction.

According to such an instruction processing device, address mode information can be assigned to the respective instruction fetch ports. Therefore, a correct address mode can be automatically determined for each port even if there is a switchover of ports due to the pre-fetch of a branch destination instruction string. Accordingly, there is no need for control using a micro-program and thereby instruction process speed can be improved.

For example, the storage circuit 1 and transfer circuit 3 shown in FIG. 1 correspond to an instruction address register 11, an instruction address generation circuit 12, an instruction fetch control circuit 13, an instruction buffer 16, a decoder 17, a branch destination address generation circuit 19 and the branch instruction control circuit 20 shown in FIG. 2, which is described later, and the branch instruction control circuit 2 shown in FIG. 1 corresponds to a branch instruction control circuit 20 shown in FIG. 2.

For example, the fetch circuit 4 shown in FIG. 1 corresponds to the instruction address register 11, the instruction address generation circuit 12 and the instruction fetch control circuit 13 shown in FIG. 2, and the control circuit 5 corresponds to an instruction control circuit 18, the branch destination address generation circuit 19, the branch instruction control circuit 20 and a PSW (Program-Status-Word) control circuit 21 shown in FIG. 2.

In this preferred embodiment, since a branch prediction for a branch instruction accompanied by an address mode change is made, the address mode information, as well as instruction address of a branch destination, are stored in a branch history. For example, a bit with the address mode information of a branch destination is stored as a part of the instruction address of the branch destination. Then, in the branch instruction control unit, it is judged whether a branch destination address used when a branch prediction is made, is correct and simultaneously it is judged whether the correct address mode of a branch destination is designated.

A bit with the address mode information of a branch destination is generated by the branch instruction control unit. The branch instruction control unit judges whether a branch instruction is accompanied by an address mode change. If the branch instruction is accompanied by an address mode change, the branch instruction control unit obtains information about an address mode after change, after the instruction is decoded. Then, the branch instruction control unit sets the obtained address mode in a bit for designating the address mode of a branch destination (address mode designation bit).

If the branch instruction is not accompanied by an address mode change, the branch instruction control unit sets the same address mode as that of the branch instruction of a branch source in the address mode designation bit since the address mode of the branch destination is not changed.

Alternatively, an address mode designation bit is not generated in the branch instruction control unit, and instead an address mode designation bit, as well as a branch designation address, can also be generated in the branch destination address generation circuit.

If the instruction processing device is provided with a plurality of instruction fetch ports and an instruction fetch is processed by way of an out-of-order system, a new address mode corresponding to a switched-over port must be designated every time a port is switched over. However, in the conventional device an address mode was not stored for each port.

In the device of this preferred embodiment, an address mode is configured to be stored for each port. Accordingly, even if the address modes of respective ports are different, a correct instruction process is executed, for example, when an instruction pre-fetch is performed at a specific port and then the instruction fetch is attempted to be restored to a sequential instruction fetch at another port.

FIG. 2 shows the detailed configuration of an instruction processing device of the present invention. An instruction processing device shown in FIG. 2 comprises an instruction address register 11, an instruction address generation circuit 12, an instruction fetch control circuit 13, an instruction cache 14, a branch history 15, an instruction buffer 16, a decoder 17, an instruction control circuit 18, a branch destination address generation circuit 19, a branch instruction control circuit 20 and a PSW control circuit 21.

Out of these, the instruction address register 11, instruction address generation circuit 12, instruction fetch control circuit 13, instruction cache 14 and branch history 15 correspond to an instruction fetch pipeline circuit, and the instruction buffer 16, decoder 17, instruction control circuit 18, branch destination address generation circuit 19, branch instruction control circuit 20 and PSW control circuit 21 correspond to an instruction execution pipeline circuit.

The instruction fetch pipeline includes an instruction address issuance cycle (IA), a table cycle (IT), a buffer cycle (IB) and a result cycle (IR), and the instruction execution pipeline includes a decoding cycle (D), an address calculation cycle (A), an execution cycle (E) and a writing cycle (W).

The instruction address register 11, instruction address generation circuit 12 and instruction fetch control circuit 13 also form an instruction fetch circuit, which is provided with three instruction fetch ports of A, B and C, respectively. For example, this instruction fetch circuit performs an instruction fetch using port A at the time of operation start, and switches from port A to another port when performing an instruction pre-fetch.

The instruction cache 14 outputs an instruction code corresponding to the instruction address issued from the instruction fetch control circuit 13, to the instruction buffer 16, and the branch history 15 forms pairs of addresses made up of the address of a branch instruction which has been branched before and the address of a branch destination at that time, and stores the pairs.

The decoder 17 decodes the instruction code stored in the instruction buffer 16 and passes the obtained information to the instruction control circuit 18, branch destination address generation circuit 19 and branch instruction control circuit 20. The instruction control circuit 18 controls instructions other than a branch instruction. The branch instruction control circuit 20 controls a branch instruction, and the PSW control circuit stores a PSW.

Two modes of 31 bits and 24 bits are used as address modes. As shown in FIG. 3, an address mode is handled as a part of an instruction address, and the bit <0> of the instruction address becomes an address mode designation bit.

This address mode designation bit is added to the bit <0> of all instruction addresses as an instruction address mode and is stored together with the instruction address in all cycles. For example, if the address mode designation bit is a logic "1", it indicates a 31-bit mode. If the bit is a logic "0", it indicates a 24-bit mode.

In the description below, out of the bits of an extended instruction address shown in FIG. 3, a portion excluding the address mode designation bit is called an "instruction address" or just an "address". FIG. 4 shows the format of the entry of the branch history 15 in the case where this address mode designation bit is used.

In FIG. 4, a branch instruction address 31 and a branch destination address 32 are related to each other. An address mode designation bit 33 for designating an address mode to be used for a branch instruction process is added to the branch instruction address 31, and an address mode designation bit 34 for designating an address mode to be used for a branch destination instruction process is added to the branch instruction address 32.

FIG. 5 is a flowchart showing the operation of the instruction processing device shown in FIG. 2.

The instruction fetch control circuit 13 provides the branch history 15 with a generated instruction address, and the branch history 15 searches for a corresponding entry using the given instruction address as a key (step S1).

If the instruction address does not hit the branch history 15, the pre-fetch of a branch destination instruction is not performed. If in the branch instruction control circuit 20, it is found that the branch instruction is branched (step S2), the branch instruction control circuit 20 receives both a branch destination address and a branch destination address mode from the branch destination address generation circuit 19 and generates a branch destination address mode designation bit (step S3). Then, the branch instruction control circuit 20 transmits both the branch destination address and branch destination address mode designation bit to the instruction fetch control circuit 13.

The instruction fetch control circuit 13 performs the instruction fetch of a branch destination based on the branch destination address and branch destination address mode received from the branch instruction control circuit 20 (step S4).

If the instruction address hits the branch history 15, the instruction pre-fetch of a branch destination is performed at another port. If in the branch instruction control circuit 20, it is found that the branch instruction is branched (step S5), the branch instruction control circuit 20 receives both a branch destination address and a branch destination address mode from the branch destination address generation circuit 19 and generates a branch destination address mode designation bit (step S6).

Then, the branch instruction control circuit 20 judges whether the branch destination address predicted by the branch history 15 and branch destination address mode designation bit are correct (step S7). If they are correct, the branch instruction control circuit 20 considers the prediction to have succeeded and continues to process the branch destination instruction (step S8). If they are not correct, the branch instruction control circuit 20 considers the prediction to have failed and instructs the instruction fetch control circuit 13 to perform a re-fetch (step S9).

If in step S5, it is found that the branch instruction is not branched, the branch instruction control circuit 20 instructs the instruction fetch control circuit 13 to stop the pre-fetch of a branch destination instruction string (step S10). Then, the instruction fetch control circuit 13 restores the fetch port to the original port and continues to process the subsequent instruction string of the branch instruction.

FIG. 6 shows signals used for such an instruction process. The instruction fetch control circuit 13 outputs a signal +IAR<0:31, P0:P3> to the instruction cache 14. The instruction cache 14 outputs a corresponding instruction code to the instruction buffer 16. Out of the signal +IAR<0:31, P0:P3>, +IAR<0>, +IAR<1:31> and +IAR<P0:P3> correspond to the address mode designation bit, instruction address and parity bits of +IAR<0:31>, respectively.

The instruction fetch control circuit 13 also outputs a signal +IAR<0> to the instruction buffer 16, and the instruction buffer 16 outputs the signal to the decoder 17 as +D_IAR<0>.

The instruction buffer 16 also stores a signal indicating the instruction address of the branch instruction +D_BR_IAR<0:31, P0:P3> and outputs this signal to the branch instruction control circuit 20. This signal can be transferred to the branch instruction control circuit 20 via the decoder 17 or it can be directly transferred from the instruction buffer 16 to the branch instruction control circuit 20. If an instruction code outputted from the instruction cache 14 corresponds to a branch instruction, a signal +D_IAR<0> matches a signal +D_BR_IAR<0>.

The decoder 17 outputs a signal +A_ADRS_MODE indicating an address mode designated as one of the operands of the branch instruction to the branch destination address generation circuit 19 together with a signal +OP_DATA for indicating data used to generate a branch destination address. This signal +A_ADRS_MODE indicates the address mode of a branch destination instruction.

The branch destination address generation circuit 19 generates a signal +EAG2<1:31, P0:P3> indicating the address of a branch destination instruction from the received signal and outputs the signal to the branch instruction control circuit 20 together with a signal +A_BSM 31BIT_ADRS_MODE indicating the address mode of the branch destination instruction. The branch destination address generation circuit 19 also receives a signal +D_BR_IAR<0> indicating the address mode designation bit of the branch instruction from the decoder 17 and, based on the signal, executes a mask process, etc., of the instruction address of the branch destination.

The branch instruction control circuit 20 receives a signal +BRHIS_TIAR<0:31, P0:P3> indicating the address and address mode designation bit of an predicted branch destination instruction from the branch history 15, compares the signal with a signal from the branch destination address generation circuit 19 and judges whether the prediction result is correct.

If the prediction result is judged to be correct, the branch instruction control circuit 20 instructs the instruction fetch control circuit 13 to continue the process of the predicted branch destination. If the prediction result is judged to be wrong, the branch instruction control circuit 20 transmits both a signal +RSBR_TIAR<0:31, P0:P3> indicating the address and address mode designation bit of the correct branch destination instruction and an instruction re-fetch request to the instruction fetch control circuit 13.

Next, the detailed configuration and operation of the instruction processing device shown in FIG. 2 are described with reference to FIGS. 7 through 12.

When the process is re-started after the first instruction fetch and an interruption, the instruction fetch control circuit 13 acquires the address mode information from the PSW control circuit 21 and sets the information in the address mode designation bit of the instruction fetch circuit. Thus, an address mode is set in each of the instruction address register 11, instruction address generation circuit 12 and instruction fetch control circuit 13.

FIG. 7 shows a circuit for storing an address mode designation bit in the instruction address generation circuit 12. Latch circuits 41, 42 and 43 shown in FIG. 7 store the address mode designation bits and instruction addresses to be fetched of ports A, B and C, respectively. The input signal +IF_EAG<0:31> of each latch circuit indicates both a generated address mode designation bit and an instruction address, and the output signals +IARA<0:31>, +IARB<0:31> and +IARC<0:31> correspond to the signal +IAR<0:31> shown in FIG. 6.

If an instruction fetch port A is to be used at the time of start, the address mode used when an instruction fetch request is issued, is inputted periodically and is stored until the clear request of the port is issued. The address mode is updated every time an instruction fetch request is issued. Therefore, if the address mode is changed on the way, the changed address mode is stored.

The operation performed when an instruction fetch port is switched over is described next. Here, as one example, the switchover of an instruction fetch port to perform an instruction pre-fetch accompanied by a branch prediction is described.

When the branch prediction of a branch instruction is performed, the instruction fetch control circuit 13 searches for a fetched instruction address in the branch history 15 and checks whether an instruction with the address has ever been branched before. If the instruction is branched, the instruction fetch control circuit 13 determines the address in which the instruction is branched and issues an instruction fetch request of the instruction address of a branch destination.

In this case, the address mode as well as instruction address of the branch destination must be predicted. In this preferred embodiment, as shown in FIGS. 3 and 4, both the instruction address and address mode of the branch destination can be simultaneously predicted by handling the address mode as a part of the address.

Generally speaking, both a branch prediction utilizing the branch history 15 and an instruction fetch of the predicted branch destination are performed prior to an instruction decoding. Therefore, it is unknown whether the predicted instruction is really a branch instruction, whether the branch is actually taken even if it is a branch instruction and whether the instruction address of the predicted branch destination is correct. Therefore, the instruction fetch of the predicted branch destination must be performed using an instruction fetch port different from the port presently being used.

If an instruction is not branched, and subsequent instruction string is sequentially executed, and specifically if a sequential instruction fetch is performed, ports shall not be switched over.

A case where a branch prediction is made, where an instruction pre-fetch is performed, where it is found that an instruction is branched after an instruction is decoded, and further, where the instruction address of a predicted branch destination is correct, is considered first. This corresponds to the case where the operation in step S8 shown in FIG. 5 is performed.

In this case, an instruction fetch after the branch is performed using a switched-over port (in this example, port B). The instruction pre-fetch of a branch destination based on the branch prediction is performed at a port different from that used for a sequential instruction fetch. In this example, ports A and B are used for a sequential instruction fetch and the instruction pre-fetch of a branch destination, respectively.

At this time, the instruction fetch control circuit 13 stores the respective address mode designation bits at ports A and B. When it is found that the branch instruction is branched after the branch instruction is decoded, and it is found that the instruction address of a predicted branch destination is correct, port B, instead of port A, becomes a sequential instruction fetch port. At this point, it becomes unnecessary for the instruction fetch circuit to store the address mode of port A.

A case where a branch prediction is made, where the pre-fetch of an instruction is performed, where it is found that an instruction is branched after the instruction is decoded, and further, where the instruction address of a predicted branch destination is wrong, is considered next. This corresponds to the case where the operation in step S9 shown in FIG. 5 is performed. In this case, operation up to the point of the instruction pre-fetch is the same as that described above.

If it is found that an instruction is branched after the instruction is decoded and it is found that the instruction address is wrong, a branch destination instruction fetch must be performed again. At this time, the instruction fetch control circuit 13 performs a instruction re-fetch using both the branch destination address generated by the branch destination address generation circuit 19 and the address mode designation bit of the branch destination generated by the branch instruction control circuit 20. Thus, all the ports of the instruction fetch control circuit are cleared and an instruction fetch is performed.

A case where a branch prediction is made, where the pre-fetch of an instruction is performed, and where it is found that the instruction is not branched after the instruction is decoded, is considered next. This corresponds to the case where the operation in step S10 shown in FIG. 5 is performed. In this case, operation up to the point of the instruction pre-fetch is the same as that described above.

If a predicted instruction is not branched after the instruction is decoded, and specifically if a predicted instruction is not a branch instruction, or if a branch condition is not met although a predicted instruction is a branch instruction, the sequential instruction fetch is re-started at the original port where the sequential instruction fetch was performed (in this example, port A).

In this case, the address mode designation bit stored at the port A of the instruction fetch control circuit 13 is used as an address mode designation bit to be used at an instruction fetch request. The port at which an instruction pre-fetch was performed based on the branch prediction (in this example, port B) is cleared.

If an instruction fetch port used for an instruction pre-fetch accompanied by a branch prediction is switched over, an address mode designation bit is set by the operation described above. Next, an address mode designation bit generation circuit for a branch destination is described.

If a branch instruction is accompanied by an address mode change, a signal for an address mode designated by the branch instruction is generated by a circuit, as shown in FIG. 8. In FIG. 8, a signal for an instruction BSM is shown, and this circuit is provided in the branch instruction address generation circuit 19.

In FIG. 8, an input signal +A_BSM indicates an instruction to change an address mode if it is a logic "1", and indicates an instruction not to change the address mode if it is a logic "0". An input signal +BR2_BIT32 indicates a 31-bit mode if it is a logic "1" and indicates a 24-bit mode if it is a logic "0".

An input signal −BR2_BIT32 corresponds to the negation of a signal +BR2_BRT32. If the signal is a logic "1", it indicates a 24-bit mode, and if the signal is a logic "0", it indicates a 31-bit mode. These signals are generated from the signal +A_ADRS_MODE shown in FIG. 6 in the branch instruction address generation circuit 19.

An AND circuit 51 outputs the logical product of the signals +A_BSM and −BR2_BIT32 as a signal +A_BSM__24BIT_ADRS_MODE. Therefore, the output signal +A_BSM__24BIT_ADRS_MODE indicates that an address mode is changed to a 24-bit mode if it is a logic "1".

An AND circuit 52 outputs the logical product of the signals +A_BSM and +BR2_BIT32 as a signal +A_BSM__31BIT_ADRS_MODE. Therefore, the output signal +A_BSM__31BIT_ADRS_MODE indicates that the address mode is changed to a 31-bit mode if it is a logic "1".

However, if there are only two address modes of a 24-bit mode and 31-bit mode, the instruction process can be controlled using only either a signal +A_BSM__24BIT_ADRS_MODE or a signal +A_BSM__31BIT_ADRS_MODE. Thus, in FIG. 6, only a signal +A_BSM__31BIT_ADRS_MODE is outputted to the branch instruction control circuit 20.

A signal of an address mode of a branch instruction itself is generated by a circuit, as shown in FIG. 9, in the branch instruction control circuit 20. A latch circuit 61 shown in FIG. 9 latches the signal +D_BR_IAR<0> shown in FIG. 6 and outputs the signal as a signal +RSBR_31BIT_ADRS_MODE. The signal +RSBR_31BIT_ADRS_MODE indicates that the address mode of a branch instruction is a 31-bit mode if it is a logic "1".

FIG. 10 shows a circuit for generating the address mode designation bit of a branch destination. This circuit is provided in the branch instruction control circuit 20 and generates an address mode designation bit depending on whether a branch instruction to be executed is accompanied by an address mode change.

If the branch instruction is accompanied by an address mode change, the circuit sets a signal of an address mode designated by the branch instruction, which is received from the branch destination address generation circuit 19, as an address mode designation bit. If the branch instruction is not accompanied by an address mode change, the circuit sets the address mode of the branch instruction as it is, as an address mode designation bit.

In FIG. 10, an input signal +RSBR_BSM_VAL indicates that a decoded branch instruction is accompanied by an address mode change if it is a logic "1". An input signal –RSBR_BSM_VAL corresponds to the negation of the signal +RSBR_BSM_VAL and indicates that the decoded branch instruction is not accompanied by an address mode change if it is a logic "1". These input signals are generated from the decoding result of the decoder 17.

An AND circuit 71 outputs the logical product of the signals +RSBR_BSM_VAL and +A_BSM_31BIT_ADRS_MODE shown in FIG. 8 to an OR circuit 73. An AND circuit 72 outputs the logical product of the signal –RSBR_BSM_VAL and the signal +RSBR_31BIT_ADRS_MODE shown in FIG. 9 to an OR circuit 73. Then, the OR circuit 73 outputs the logical sum of the outputs of these two AND circuits as a signal +EAG2<0> indicating the address mode designation bit of a branch destination.

Therefore, the output signal +EAG2<0> indicates that the address mode of a branch destination is a 31-bit mode if it is a logic "1" and indicates that the address mode of a branch destination is a 24-bit mode if it is a logic "0".

This signal +EAG2<0> is added to the signal +EAG2<1:31> indicating a branch destination address shown in FIG. 6, and a signal +EAG2<0:31, P0:P3> is generated. The signal +EAG2<0:31, P0:P3> indicates both the address mode designation bit and the branch destination address of a branch destination and is stored in the branch instruction control circuit 20.

Next, a circuit for judging whether both the instruction address and address mode designation bit of a predicted branch destination are correct, is described.

FIG. 11 shows such a judgment circuit, which is provided in the branch instruction control circuit 20. In FIG. 11, an input signal +BRHIS_TIAR<0:31, P0:P3> indicates both a branch destination address and a branch destination address mode designation bit predicted by a branch prediction.

An EXNOR circuit 81 compares the signal +EAG2<0:31,P0:P3> with the signal +BRHIS_TIAR<0:31, P0:P3> bit by bit and outputs a signal indicating the negation of the exclusive logical sum of two corresponding bits. In this preferred embodiment, since an address mode designation bit is handled as a part of an address, an address mode designation bit, a branch destination address and parity bits are simultaneously compared.

An AND circuit 82 outputs the logical product of the comparison results (<0>, <1>, . . . , <P3>) of all bits outputted by the EXNOR circuit 81 as a signal +RSBR_TIAR_MATCH.

Therefore, if all of the address mode designation bit, branch destination address and parity bits match, the signal +RSBR_TIAR_MATCH becomes a logic "1". In this case, the branch instruction control circuit 20 judges that the prediction has succeeded and continues the process without modification.

However, if one of those bits does not match, this signal becomes a logic "0" and it is judged that the branch prediction has failed. In this case, the branch instruction control circuit 20 outputs both a branch destination address generated by the branch destination address generation circuit 19 and an address mode designation bit generated by the branch instruction control circuit 20 to the instruction fetch control circuit 13 as the signal +RSBR_TIAR<0:31, P0:P3> shown in FIG. 6. Thus, the instruction fetch of the branch destination is re-started.

When finishing the control of a branch instruction, the branch instruction control circuit 20 also judges whether the branch instruction is accompanied by an address mode change and outputs the judgment result to the PSW control circuit 21. Thus, since information about a branch instruction accompanied by an address mode change is stored in the PSW control circuit 21, the instruction processing device can be controlled while the instruction by which the address mode is being changed is determined.

When the instruction re-fetch request of a branch destination is issued, the branch instruction control circuit 20 also outputs the address mode designation bit as well as the instruction address of the branch destination to the PSW control circuit 21. Thus, since the address mode as well as the instruction address of the branch destination are stored in the PSW control circuit 21, the instruction processing device can be controlled based on the address mode.

FIG. 12 shows such a circuit for generating an output signal to the PSW control circuit 21. This circuit is provided in the branch instruction control circuit 20. In FIG. 12, an input signal +RSBR_TAKEN indicates that a branch instruction is actually branched if it is a logic "1".

An AND circuit 91 outputs the logical product of the signals +RSBR_TIAR<0:31, P0:P3> and +RSBR_TAKEN as a signal +COMPLETE_RSBR_TIAR<0:31, P0:P3>. Therefore, this output signal indicates both the address mode designation bit and instruction address of the branch destination existing when the branch instruction is executed and branched.

An AND circuit 92 outputs the logical product of the signal +RSBR_BSM_VAL shown in FIG. 10 and the signal +RSBR_TAKEN as a signal +COMPLETE_RSBR_BSM. Therefore, this output signal indicates that the instruction executed when the branch instruction is branched is a branch instruction BSM which changes the address mode.

These output signals +COMPLETE_RSBR_TIAR<0:31, P0:P3> and +COMPLETE_RSBR_BSM are outputted to the PSW control circuit 21 as control signals.

According to the conventional instruction processing device, the address mode of a branch destination could not be predicted in a branch prediction, and the address mode of a branch destination instruction could not be generated in the calculation of a branch destination address. If the instruction processing device is provided with a plurality of instruction fetch ports, the address mode was not stored for each port. Therefore, if ports are switched over, an instruction which changes the branch destination address mode could not be accurately controlled by way of hardware. Accordingly, the conventional device required control using a micro-program.

However, according to the instruction processing device of the present invention, address mode information is added to the instruction addresses of all instructions as a part of the instruction addresses, and is stored in all cycles. Accordingly, accurate control is available by way of hardware based on the stored address mode in any cycle.

For example, when the instruction string pre-fetch for the branch destination of a branch instruction accompanied by an address mode change is performed based on a branch prediction, a correct fetch operation can be performed based on the address mode after change. When the instruction address of a branch destination is calculated by an address generator, the address mode of the branch destination can be simultaneously generated.

Furthermore, if the device is provided with a plurality of instruction fetch ports, an address mode is stored for each port. Therefore, even if ports are switched over, a correct fetch operation is available based on the address mode obtained after the switchover.

Since in this way, a branch instruction accompanied by an address mode change can be accurately controlled by way of hardware, there is no need for control using a micro-program and thereby the number of clock cycles needed for an instruction execution can be greatly reduced. Accordingly, the process speed of the instruction processing device can be greatly improved.

In the preferred embodiments described above, two address modes, 24-bit mode and 31-bit mode, are used. However, even if three or more address modes are used, a similar control can be exercised by using a plurality of address mode designation bits.

The present invention can also be applied to an arbitrary mode, which is to be determined at the time of an instruction fetch, of an information processing apparatus other than an address mode. For example, if a branch instruction accompanied by the change of an operation mode, such as an ESA (enterprise system architecture) mode which is specified on the operation specification of a computer, is processed, it is sufficient that information designating an operation mode is added to the instruction addresses of all instructions as a part of the instruction addresses and is stored in all cycles. Thus, control based on the stored operation mode information becomes available in an arbitrary cycle.

According to the present invention, an instruction accompanied by a mode change can be accurately controlled by way of hardware in an information processing apparatus adopting an out-of-order process system. Accordingly, instruction process speed can be improved.

What is claimed is:

1. An instruction processing device provided with an instruction fetch pipeline and an instruction execution pipeline and performing an instruction fetch and an instruction execution by way of an out-of-order system, comprising:
   a storage circuit storing a combination of address mode information of a fetched instruction and an instruction address of the fetched instruction, after an instruction fetch request is issued in the instruction fetch pipeline and before the fetched instruction is decoded in a decoding cycle of the instruction execution pipeline when the instruction fetch pipeline and the instruction execution pipeline operate by way of the out-of-order system, the address mode information indicating a size of an address space for the fetched instruction and used for a mask process of another instruction address;
   a branch instruction control circuit controlling a branch instruction using the address mode information stored in the storage circuit after the fetched instruction is decoded in the decoding cycle if the fetched instruction is the branch instruction; and
   a transfer circuit transferring the address mode information stored in the storage circuit to the branch instruction control circuit when the branch instruction is executed in an execution cycle of the instruction execution pipeline, the branch instruction control circuit controlling the branch instruction using the address mode information transferred thereto, as branch address mode information of a branch destination of the branch instruction if the branch instruction is not accompanied by an address mode change.

2. The instruction processing device according to claim 1, wherein said branch instruction control circuit stores a combination of the address mode information of the branch destination of the branch instruction and an instruction address of the branch destination.

3. The instruction processing device according to claim 2, wherein said branch instruction control circuit generates the address mode information of the branch destination based on the address mode information of the branch instruction.

4. The instruction processing device according to claim 2, wherein said branch instruction control circuit judges whether address mode information and an instruction address of a branch destination predicted by a branch prediction are correct using the address mode information and instruction address of the branch destination.

5. The instruction processing device according to claim 2, wherein said branch instruction control circuit outputs a signal indicating the address mode information and instruction address of the branch destination when issuing a branch destination instruction fetch request to the instruction fetch pipeline.

6. The instruction processing device according to claim 1, wherein said branch instruction control circuit outputs a signal indicating whether the branch instruction is accompanied by the address mode change when control of the branch instruction is terminated.

7. The instruction processing device according to claim 1, further comprising a branch history circuit relating address mode information and an instruction address of a branch instruction to address mode information and an instruction address of a branch destination, storing related address mode information and instruction addresses of the branch instruction and branch destination, and making a branch prediction for the fetched branch instruction.

8. The instruction processing device according to claim 1, further comprising a branch destination address generation circuit generating an instruction address of the branch destination of the branch instruction using the address mode information stored in the storage circuit, and
   wherein said transfer circuit transfers the address mode information stored in the storage circuit to the branch destination address generation circuit when the branch instruction is executed.

9. An instruction processing device provided with an instruction fetch pipeline and an instruction execution pipeline and performing an instruction fetch and an instruction execution by way of an out-of-order system, comprising:
   a fetch circuit fetching an instruction in the instruction fetch pipeline;
   a storage circuit storing address mode information of each fetched instruction as a part of an instruction address of the fetched instruction, after an instruction fetch request is issued and before each fetch instruction is decoded in a decoding cycle of the instruction execution pipeline when the instruction fetch pipeline and the instruction execution pipeline operate by way of the out-of-order system, the address mode information indicating a size of an address space for a corresponding fetched instruction and used for a mask process of another instruction address; and a control circuit controlling an instruction process of each instruction based on the address mode information that has been stored, after the fetched instruction is decoded in the decoding cycle, the control circuit controlling a branch instruction using the address mode information that has been stored as branch address mode information of a branch destination of the branch instruction if the fetched instruction is the branch instruction and is not accompanied by a mode change.

10. An instruction processing device provided with a plurality of instruction fetch ports and performing an instruction fetch by way of an out-of-order system, comprising:

a plurality of storage circuits, each storing a combination of address mode information of an instruction to be fetched and an instruction address of the instruction, each combination stored in each storage circuit related to each of the plurality of instruction fetch ports which operate by way of the out-of-order system, the address mode information indicating a size of an address space for the fetched instruction and used for a mask process of another instruction address; and a fetch circuit performing an instruction fetch based on first address mode information corresponding to a first port of the instruction fetch ports by way of the out-of-order system, performing an instruction pre-fetch of a branch destination of a branch instruction based on second address mode information corresponding to a second port of the instruction fetch ports by way of the out-of-order system, and continuing an instruction fetch based on the second address mode information corresponding to the second port if a branch is performed according to the branch instruction.

11. An instruction processing method using an instruction fetch pipeline and an instruction execution pipeline to perform an instruction fetch and an instruction execution by way of an out-of-order system, comprising:

handling address mode information of an information processing apparatus, which is to be determined when fetching each instruction, as a part of an instruction address, the address mode information indicating a size of an address space for a fetched instruction and used for a mask process of another instruction address;

fetching an instruction;

storing address mode information of the fetched instruction as a part of an instruction address of the fetched instruction in each cycle of an instruction process for the fetched instruction, after an instruction fetch request is issued in the instruction fetch pipeline and before the fetched instruction is decoded in a decoding cycle of the instruction execution pipeline when the instruction fetch pipeline and the instruction execution pipeline operate by way of the out-of-order system; and controlling the instruction process for the fetched instruction based on the address mode information that has been stored, after the fetched instruction is decoded in the decoding cycle, and when the fetched instruction is a branch instruction and is not accompanied by a mode change, using the address mode information that has been stored as branch address mode information of a branch destination of the branch instruction.

12. An instruction processing device provided with an instruction fetch pipeline and an instruction execution pipeline and performing an instruction fetch and an instruction execution by way of an out-of-order system, comprising:

storage means for storing a combination of address mode information of a fetched instruction and an instruction address of the fetched instruction, after an instruction fetch request is issued in the instruction fetch pipeline and before the fetched instruction is decoded in a decoding cycle of the instruction execution pipeline when the instruction fetch pipeline and the instruction execution pipeline operate by way of the out-of-order system, the address mode information indicating a size of an address space for the fetched instruction and used for a mask process of another instruction address;

branch instruction control means for controlling a branch instruction using the address mode information stored in the storage means after the fetched instruction is decoded in the decoding cycle if the fetched instruction is the branch instruction; and transfer means for transferring the address mode information stored in the storage means to the branch instruction control means when the branch instruction is executed in an execution cycle of the instruction execution pipeline, the branch instruction control means controlling the branch instruction using the address mode information transferred thereto, as branch address mode information of a branch destination of the branch instruction if the branch instruction is not accompanied by an address mode change.

13. An instruction processing device provided with an instruction fetch pipeline and an instruction execution pipeline and performing an instruction fetch and an instruction execution by way of an out-of-order system, comprising:

fetch means for fetching an instruction;

storage means for storing address mode information of each fetched instruction as a part of an instruction address of the fetched instruction, after an instruction fetch request is issued in the instruction fetch pipeline and before the fetched instruction is decoded in a decoding cycle of the instruction execution pipeline when the instruction fetch pipeline and the instruction execution pipeline operate by way of the out-of-order system, the address mode information indicating a size of an address space for the fetched instruction and used for a mask process of another instruction address; and control means for controlling an instruction process of each instruction based on the address mode information stored in the storage means, after the fetched instruction is decoded in the decoding cycle, the control means controlling a branch instruction using the address mode information stored in the storage means as branch address mode information of a branch destination of the branch instruction if the fetched instruction is the branch instruction and is not accompanied by a mode change.

14. An instruction processing device provided with a plurality of instruction fetch ports and performing an instruction fetch by way of an out-of-order system, comprising:

a plurality of storage means, each for storing a combination of address mode information of an instruction to be fetched and an instruction address of the instruction, each combination stored in each storage means related to each of the plurality of instruction fetch ports which operate by way of the out-of-order system, the address mode information indicating a size of an address space for the fetched instruction and used for a mask process of another instruction address; and fetch means for performing an instruction fetch based on first address mode information corresponding to a first port of the instruction fetch ports by way of the out-of-order system, for performing an instruction prefetch of a branch destination of a branch instruction based on second address mode information corresponding to a second port of the instruction fetch ports by way of the out-of-order system, and for continuing an instruction fetch based on the second address mode information corresponding to the second port if a branch is performed according to the branch instruction.

15. An instruction processing device provided with an instruction fetch pipeline and an instruction execution pipeline and performing an instruction fetch and an instruction execution by way of an out-of-order system, comprising:

a storage circuit to store a combination of address mode information and an instruction address for instructions to be fetched, after an instruction fetch request is issued in the instruction fetch pipeline and before a fetched instruction is decoded in a decoding cycle of the instruction execution pipeline when the instruction fetch pipeline and the instruction execution pipeline operate by way of the out-of-order system, the address mode information indicating a size of an address space for a fetched instruction and used for a mask process of another instruction address;

a branch instruction control circuit to control execution of a branch instruction using the address mode information stored in said storage circuit after one of the instructions to be fetched has been fetched as the branch instruction and decoded in the decoding cycle; and a transfer circuit to transfer the address mode information stored in said storage circuit to said branch instruction control circuit when the branch instruction is executed in an execution cycle of the instruction execution pipeline, said branch instruction control circuit controlling the branch instruction using the address mode information transferred thereto, as a branch destination of the branch instruction if the branch instruction is not accompanied by an address mode change.

* * * * *

UNITED STATES PATENT AND TRADEMARK OFFICE
CERTIFICATE OF CORRECTION

PATENT NO. : 7,036,003 B1
APPLICATION NO. : 09/528714
DATED : April 25, 2006
INVENTOR(S) : Ryuichi Sunayama It is certified that error appears in the above-identified patent and that said Letters Patent is hereby corrected as shown below:

On Title Page, Item (56) Other Pubs. Column 2, Line 10, change "Soncs," to --Sons,--.

Signed and Sealed this

Seventh Day of November, 2006

JON W. DUDAS
*Director of the United States Patent and Trademark Office*